United States Patent
Rabyking

(10) Patent No.: US 10,063,787 B2
(45) Date of Patent: Aug. 28, 2018

(54) METHOD OF REDUCING DIGITAL VIDEO FLICKER

(71) Applicant: Apical Ltd, Cambridge (GB)

(72) Inventor: Serge Rabyking, Loughborough (GB)

(73) Assignee: Apical Ltd., Cambridge (GB)

( * ) Notice: Subject to any disclaimer, the term of this patent is extended or adjusted under 35 U.S.C. 154(b) by 0 days.

(21) Appl. No.: 15/471,399

(22) Filed: Mar. 28, 2017

(65) Prior Publication Data

US 2017/0201669 A1 Jul. 13, 2017

Related U.S. Application Data

(63) Continuation of application No. PCT/GB2015/053107, filed on Oct. 20, 2015.

(30) Foreign Application Priority Data

Oct. 20, 2014 (GB) .................................. 1418619.1

(51) Int. Cl.
  *H04N 5/235* (2006.01)
  *H04N 9/04* (2006.01)
(52) U.S. Cl.
  CPC ............. *H04N 5/2357* (2013.01); *H04N 9/04* (2013.01)
(58) Field of Classification Search
  CPC .............................. H04N 5/2357; H04N 9/04
  See application file for complete search history.

(56) References Cited

U.S. PATENT DOCUMENTS

| 2007/0035650 A1* | 2/2007 | Suzuki | H04N 5/23245 348/312 |
| 2007/0195182 A1* | 8/2007 | Ito | H04N 5/23245 348/308 |
| 2008/0309791 A1 | 12/2008 | Nishiwaki et al. | |
| 2010/0013953 A1 | 1/2010 | Niikura | |
| 2010/0026820 A1* | 2/2010 | Senoo | H04N 5/23248 348/208.7 |

(Continued)

FOREIGN PATENT DOCUMENTS

| GB | 2433370 A | 6/2007 |
| JP | 2000032352 A | 1/2000 |

(Continued)

OTHER PUBLICATIONS

International Search Report dated Jan. 4, 2016 for PCT Application No. PCT/GB2015/053107.

(Continued)

*Primary Examiner* — Jason A Flohre
(74) *Attorney, Agent, or Firm* — EIP US LLP

(57) ABSTRACT

Methods of reducing digital video flicker, and related systems, devices and computer program products are provided. A method of reducing human-perceivable flicker in a digital video is provided, in which video frames are recorded unevenly with respect to time and in synchronization with a lighting flicker frequency. A system including a camera and a computer is provided, the system configured to reduce human-perceivable flicker in a digital video, in which video frames are recorded unevenly with respect to time and in synchronization with a lighting flicker frequency, so as to reduce human-perceivable flicker in a video assembled using the computer from the video frames.

14 Claims, 2 Drawing Sheets

(56) References Cited

U.S. PATENT DOCUMENTS

| | | | |
|---|---|---|---|
| 2011/0157415 A1* | 6/2011 | Goh | H04N 5/2357 |
| | | | 348/226.1 |
| 2011/0207505 A1* | 8/2011 | Yoon | H04W 4/02 |
| | | | 455/556.1 |
| 2012/0307106 A1 | 12/2012 | Spears et al. | |
| 2013/0242143 A1* | 9/2013 | Chen | H04N 5/23209 |
| | | | 348/241 |
| 2014/0063285 A1 | 3/2014 | Kakidani et al. | |
| 2017/0280042 A1* | 9/2017 | Tadano | H04N 5/2357 |

FOREIGN PATENT DOCUMENTS

| | | | |
|---|---|---|---|
| JP | 2005354292 A | 12/2005 |
| JP | 2012204872 A | 10/2012 |
| JP | 2013255005 A | 12/2013 |
| WO | 2016063023 A1 | 4/2016 |

OTHER PUBLICATIONS

Combined Search and Examination Report dated Mar. 15, 2016 for Application No. GB1518581.2.

\* cited by examiner

METHOD OF REDUCING DIGITAL VIDEO FLICKER

CROSS-REFERENCE TO RELATED APPLICATIONS

The present application is a continuation of the international (PCT) application no. PCT/GB2015/053107, filed Oct. 20, 2015, which claims priority to foreign application no. GB 1418619.1, filed Oct. 20, 2014, the contents of all of which are incorporated herein by reference in their entirety.

FIELD OF THE DISCLOSURE

The field of this disclosure relates to methods of reducing digital video flicker, and to related systems, devices and computer program products.

BACKGROUND

A known problem in digital video recording is that flickering of the image may be seen during playback if the video is recorded under lighting powered by alternating current. The alternating current has a frequency of 60 Hertz (Hz) or 50 Hz. Because power varies as the square of the current, flickering lighting will have a flicker frequency which is double the mains frequency, which is therefore 120 Hz or 100 Hz. But this 120 Hz or 100 Hz flicker frequency is not the flickering seen during video playback. The flicker during video playback may arise because of a beat effect between the constant but mismatched frequencies of the flickering light source and the frame capture rate of the sensor.

Flickering in video playing may be readily perceived if the video playback flicker frequency is below about 60 Hz. Flickering in video playing may be weakly perceived if the video playback flicker frequency is greater than 60 Hz and below 100 Hz. Flickering in video playing will not be perceived if the video playback flicker frequency is 100 Hz or more.

Digital image cameras may include a digital image sensor, including an active imaging pixel array. The digital image sensor may be programmable, through an interface. The senor may be operated in a default mode, or it may be user-programmed to control the frame size, exposure, or gain setting, for example. The pixel array may include optical black columns and rows around the edges of the array, to monitor the black level, for black level adjustment. Image data may be read out in a progressive scan. Valid image data may be next to horizontal blanking and vertical blanking.

The Pixel Clock is a high frequency pulse train that may determine when the image sensor's data lines have valid data. On the active edge of the pixel clock (which can be either the rising edge or the falling edge, depending on the camera), the digital lines should all have a constant value that is input into the image acquisition device, which latches in the data. The data changes to the next pixel value before the next active edge of the pixel clock, so that the next pixel value will get latched into the image acquisition device. During the image capture process, each pixel accumulates light for a certain time and is then read.

It is known to remove flicker by altering the frame rate of a digital video camera to equal the artificial lighting flicker rate divided by an integer. The idea is that the start of each frame will then have the same light intensity as the corresponding start of all successive frames—so that there will be no light flicker. So in the US, an iPhone6 with native 1080p filming at 60 frames per second (fps) or an iPhone5 with native 720p filming at 30 fps will exhibit no flicker when filming in lighting flickering with a flicker rate of 120 Hz, because 120/60 is exactly 2, and because 120/30 is exactly 4. But those same devices recording video in Europe, with a 100Hz light flicker frequency, may exhibit flicker during video playback because 100/60 is not an integer, and because 100/30 is not an integer. And smartphones do not provide the end-user with any native capability to alter the frame rate to reduce flicker: a typical smartphone might permit recording at one frame rate, so 30 fps, or 60 fps, and another much higher rate for slow-motion recording. But they typically do not permit the kinds of adjustment needed to reduce flicker; this kind of adjustment is however possible in a professional-grade video camera, such as the cameras from the Red Digital Cinema Camera Company.

If the formula fps*N=F*2 is valid, where fps is the frame rate, and F is the mains current frequency (50 Hz or 60 Hz), and the integer number N=1,2, . . . then there will be no visible flicker. This is because in this condition, the frame rate of a digital video camera is equal to the artificial lighting flicker rate divided by an integer.

It is also known to remove flicker by altering the shutter speed of a digital video camera to equal the artificial lighting flicker rate divided by an integer. The idea is that each frame will then include a whole number of cycles of varying light intensity—so again there will be no light flicker. So if your camera shoots at 60 frames per second, and you're in Europe with a 100 Hz light flicker, then you may set your shutter to a constant $\frac{1}{100}$ seconds (s). Or if you are shooting at 30 fps with a 100 Hz light flicker, you can set your shutter to any of $\frac{1}{100}$ s, $\frac{1}{50}$ s, $\frac{1}{33.3}$ s. But this approach is only suitable when the environment is not bright. The brighter the environment, the faster the shutter speed should be, otherwise the image will be overexposed.

A drawback of these known approaches to reducing flicker seen in video playback is that they may lead to under-utilization of device video recording capabilities. For example, for a given image resolution, a video recording device may be capable of filming at up to about 50 fps. But under 120Hz light flickering, to eliminate flicker, the frame rate would have to be reduced to 40 fps, because 120/40 is an integer, whereas 120/50 is not an integer. Of course 60 fps would also eliminate flicker, because 120/60 is an integer, but 60 fps is not achievable by the device in this example. It is desirable to fully utilize device video recording capabilities, without leading to flickering in video playback.

SUMMARY

According to a first aspect, there is provided a method of reducing human-perceivable flicker in a digital video, in which, at constant time-averaged illumination intensity, video frames are recorded unevenly with respect to time and in synchronization with a lighting flicker frequency. An advantage is that it is possible to fully utilize video recording capabilities of a device, without leading to flickering in video playback. The method has a technical effect on a process which is carried on outside the computer, because flicker is reduced during video play.

Optional implementation features include any one or more of the following: a pixel rate frequency of an image sensor is increased relative to a pixel rate frequency of the image sensor corresponding to recording video frames evenly with respect to time at an average time between video frames, so as to permit more rapid video frame recording than for the average time between video frames; the pixel rate frequency is increased to a fixed value, and then the interval between frame capture times is varied by varying a V blanking value from frame to frame; some frames are recorded closer together in time than an average time between video frames, and other frames are recorded further apart in time than the average time between video frames; each frame is recorded at the same light intensity as the corresponding start of all successive frames; the time interval between successive frames is adjusted so that the start of a frame will have the same light intensity as the corresponding start of all successive frames, whilst maintaining the overall frame rate; human-perceivable flicker in the digital video is eliminated; the video is assembled with frames which are equally spaced in time; a position is determined using a position determining system, and the lighting flicker frequency is identified based on the determined position; the local mains frequency is a user settable parameter for use in video recording, and in which the lighting flicker frequency is double the local mains frequency; the lighting flicker frequency is 120 Hz; the lighting flicker frequency is 100 Hz.

According to a second aspect, there is provided a system including a camera and a computer, the system configured to reduce human-perceivable flicker in a digital video, in which, at constant time-averaged illumination intensity, video frames are recorded unevenly with respect to time and in synchronization with a lighting flicker frequency, so as to reduce human-perceivable flicker in a video assembled using the computer from the video frames. An advantage is that it is possible to fully utilize video recording capabilities of the system, without leading to flickering in video playback. The system has a technical effect on a process which is carried on outside the computer, because flicker is reduced during video play.

The system may be one in which a pixel rate frequency of an image sensor of the camera is increased relative to a pixel rate frequency of the image sensor corresponding to recording video frames evenly with respect to time at an average time between video frames, so as to permit more rapid video frame recording than for the average time between video frames. The system may implement any one or more of the features defined above. The system may be a computer vision system, an object recognition system, a human detection system, an autonomous vehicle computer vision system, a robotics computer vision system, a smartphone, a digital camera.

According to a third aspect, there is provided a computer program product for reducing human-perceivable flicker in a digital video, the computer program product when executing on a computer configured to record video frames unevenly with respect to time and in synchronization with a lighting flicker frequency, at constant time-averaged illumination intensity. The computer program product may be further configured to implement any one or more of the features defined above.

According to a fourth aspect, there is a video recording device, such as a smartphone, which displays to the end-user a user-selectable option to reduce light flicker, and the device is programmed so that when the option is selected, then video frames are automatically recorded unevenly with respect to time and in synchronization with a lighting flicker frequency, at constant time-averaged illumination intensity. The smartphone may use a light sensor to measure the lighting flicker frequency, or may use knowledge of its geographic location to infer the lighting flicker frequency, or the end-user may define the AC current frequency. The device may implement any one or more of the features defined above.

According to a fifth aspect, there is provided a method of reducing human-perceivable flicker in a digital video, in which, at constant time-averaged illumination intensity, in a cycle of video recording, video frames are recorded unevenly with respect to time, and all frames of the cycle are recorded either in synchronization with a lighting flicker frequency or 90 degrees out of phase with the lighting flicker frequency, and at least one frame in the cycle is recorded in synchronization with the lighting flicker frequency, and at least one frame in the cycle is recorded 90 degrees out of phase with the lighting flicker frequency, and image processing is applied so that all frames of the cycle are provided as if recorded under identical illumination intensity conditions. An advantage is that it is possible to fully utilize video recording capabilities of a device, without leading to flickering in video playback. An advantage is that this method may use less battery power than the method according to the first aspect. The method has a technical effect on a process which is carried on outside the computer, because flicker is reduced during video play.

According to a sixth aspect, there is provided a system including a camera and a computer, the system configured to reduce human-perceivable flicker in a digital video, in which, at constant time-averaged illumination intensity, in a cycle of video recording, video frames are recorded unevenly with respect to time, and all frames of the cycle are recorded either in synchronization with a lighting flicker frequency or 90 degrees out of phase with the lighting flicker frequency, and at least one frame in the cycle is recorded in synchronization with the lighting flicker frequency, and at least one frame in the cycle is recorded 90 degrees out of phase with the lighting flicker frequency, and image processing is applied so that all frames of the cycle are provided as if recorded under identical illumination intensity conditions, so as to reduce human-perceivable flicker in a video assembled using the computer from the video frames.

According to a seventh aspect, there is provided a computer program product for reducing human-perceivable flicker in a digital video, the computer program product when executing on a computer configured to, at constant time-averaged illumination intensity, in a cycle of video recording, (i) record video frames unevenly with respect to time, and all frames of the cycle are recorded either in synchronization with a lighting flicker frequency or 90 degrees out of phase with the lighting flicker frequency, and at least one frame in the cycle is recorded in synchronization with the lighting flicker frequency, and at least one frame in the cycle is recorded 90 degrees out of phase with the lighting flicker frequency, and (ii) apply image processing so that all frames of the cycle are provided as if recorded under identical illumination intensity conditions.

According to an eighth aspect, there is provided a video recording device, such as a smartphone, which displays to the end-user a user-selectable option to reduce light flicker, and the device is programmed so that when the option is selected, then at constant time-averaged illumination intensity, in a cycle of video recording, video frames are automatically recorded unevenly with respect to time, and all frames of the cycle are recorded either in synchronization with a lighting flicker frequency or 90 degrees out of phase with the lighting flicker frequency, and at least one frame in the cycle is recorded in synchronization with the lighting flicker frequency, and at least one frame in the cycle is recorded 90 degrees out of phase with the lighting flicker frequency, and image processing is applied so that all frames of the cycle are provided as if recorded under identical illumination intensity conditions.

BRIEF DESCRIPTION OF THE DRAWINGS

The above and other aspects will now be described, by way of example only, with reference to the following Figures, in which.

DETAILED DESCRIPTION

In our approach, we keep the headline frame rate the same (e.g. if the camera shoots at 30 fps, then we preserve that as an average frame rate), but we decrease the frame interval for some frames and increase the frame interval for others, whilst ensuring that the start of a frame will then have the same light intensity as the corresponding start of all successive frames, so there is no flicker in video playback. The frame start may be defined as the start of capturing the first pixel of the frame.

So we adjust the frame rate or time interval between successive frames so that the start of a frame will have the same light intensity as the corresponding start of all successive frames, whilst maintaining the overall frame rate, e.g. measured over a second or more.

It is normal to assume that if your video camera shoots at 30 fps, then the time interval between successive frames must be a constant 33.3 milliseconds (ms) (this assumption applies even when dealing with professional-grade video cameras). But instead, with implementations described herein, we can locally, i.e. within a time period of a second, adjust the time intervals so that they are 30 ms, 30 ms and 40 ms, for example, if we have a 100 Hz flickering light source, which flickers every 10 ms. So here we speed up the frame rate for the first two frames, but slow it down for the last one. For all frames, the start of a frame will then have the same light intensity as the corresponding start of all successive frames—so that there will be no light flickering seen during video playback.

Figure 1:
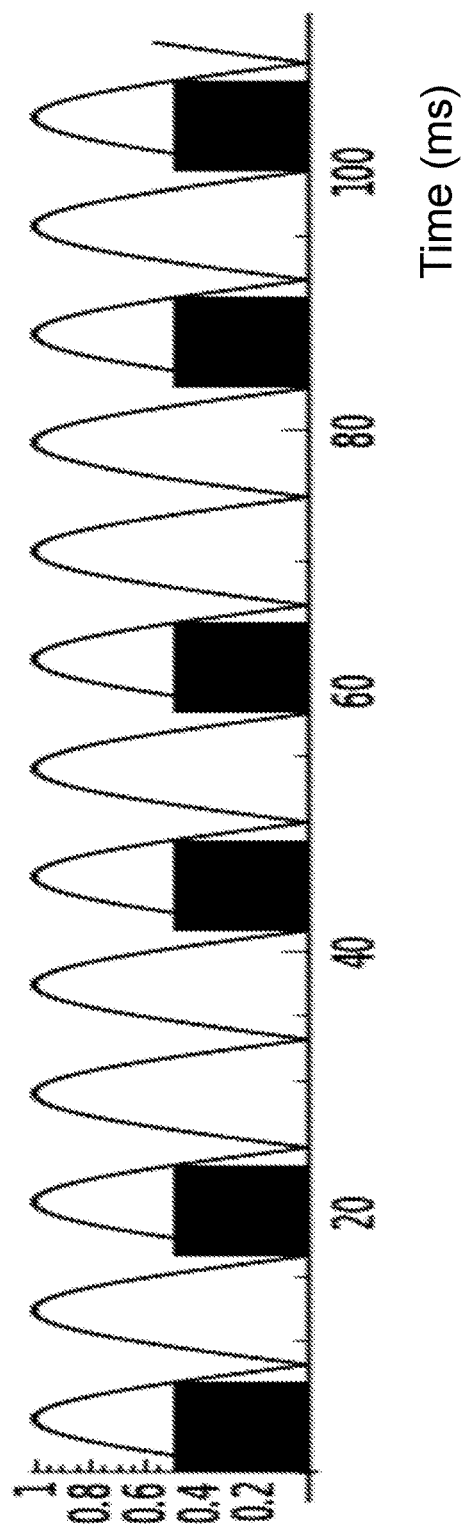
FIG. 1 shows a schematic solution example in which a video is recorded at 50 fps under 60 Hz mains frequency, without flickering.

In an example, a video is recorded at 50 fps under 60 Hz mains frequency lighting, which provides lighting flickering at 120 Hz. The average time between frames is 1/50 s which is 20 ms. The time between light flickers is 1/120 s which is about 8.3 ms. A conventional video camera would record an image every 20 ms. A flickering frequency may be visible in a recorded video at a beat frequency which is 120/2 Hz-50 Hz which is 10 Hz. A schematic frame recording solution example is shown in FIG. 1, in which the sinusoidal line represents the light intensity modulation, and the black rectangles represent image recording. Instead of recording images every 20 ms, which could lead to flicker in a played-back video, images are instead recorded starting at 0 ms, 16.7 ms, 41.7 ms, 58.3 ms, and 83.3 ms. This provides the required 5 frames in 100 ms, which provides 50 fps on average. The images are all recorded under equal intensity, which eliminates flicker.

Figure 2:
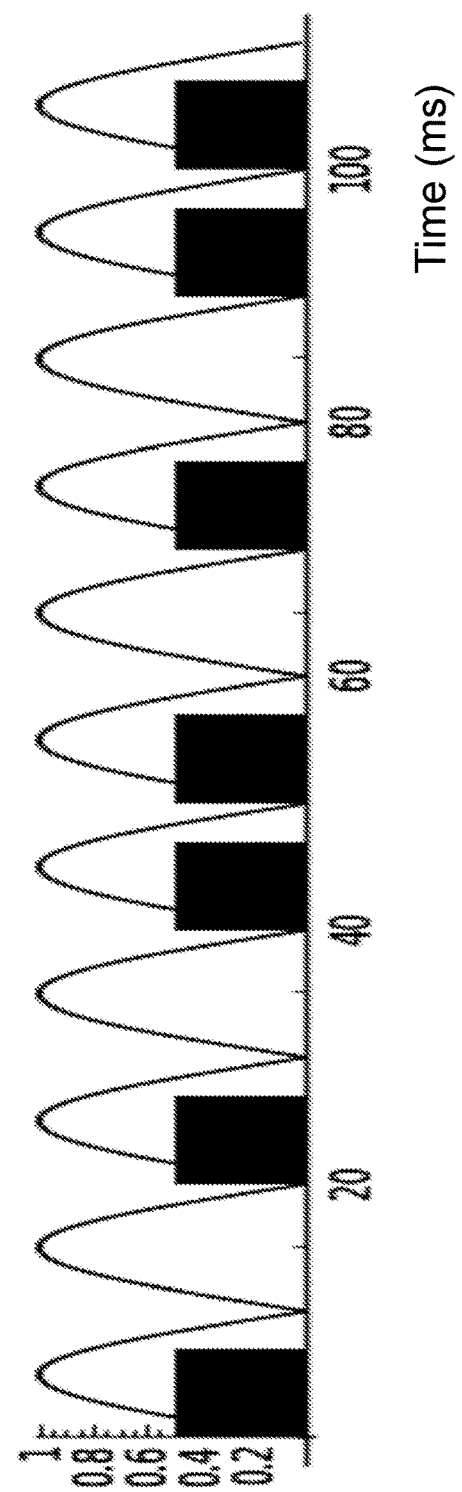
FIG. 2 shows a schematic solution example in which a video is recorded at 60 fps under 50 Hz mains frequency, without flickering.

In an example, a video is recorded at 60fps under 50Hz mains frequency, which provides a light flickering at 100 Hz. The average time between frames is 1/60 s which is about 16.7 ms. A conventional video camera would record an image every 16.7 ms. A flickering frequency may be visible in a recorded video at a beat frequency which is 60 Hz-100/2 Hz which is 10 Hz. A schematic frame recording solution example is shown in FIG. 2, in which the sinusoidal line represents the light intensity modulation, and the black rectangles represent image recording. Instead of recording images every 16.7 ms, which could lead to flicker in a played-back video, images are instead recorded starting at 0 ms, 20 ms, 40 ms, 50 ms, 70 ms and 90 ms. This provides the required 6 frames in 100 ms, which provides 60 fps on average. The images are all recorded under equal light intensity, which eliminates flicker. Note that the actual shutter speed used is not relevant since it is constant over the short-time intervals relevant to reducing flicker; what is key here is the time interval between the start of successive frames.

An implementation issue can arise if we record a frame earlier than dictated by the video filming frequency. For example, the first two frames in FIG. 1 are recorded 16.7 ms apart, whereas the 50 fps video filming frequency would dictate that these frames should have been recorded 20 ms apart. The 'pixel clock' or 'pixel rate frequency' of the sensor might not be fast enough to permit recording a frame earlier in this way: if it is set for recording frames 20 ms apart it might not be able to record two frames just 16.7 ms apart.

We should clarify the image recording process. There are two processes: the capture and readout. The capture process is basically connected to the shutter. And readout is the process of reading data from the sensor. These processes do not occur at the same time, but are shifted by the shutter time. To simplify somewhat, when the shutter closes the readout starts. These two processes are working in parallel but are shifted by the shutter time. More specifically, a rolling shutter may be used—when a line of pixels stops light accumulation, the line of pixels is ready for readout of the pixel values. There is only one readout process and we cannot read the first pixel of the next frame until we have read out the last pixel of current frame. So we need to have a faster readout capability to be able to start reading the next frame earlier than the average time between frames, when required.

The flicker during video playback arises because of a beat effect between the constant but mismatched frequencies of the flickering light source and the frame capture rate of the sensor. If we alter the time interval between successive frames so that they are not all the same, then we can reduce or eliminate the beat effect because we no longer have both the light source and frame capture operating at constant but mismatched frequencies. So under 100 Hz flickering light, we could maintain a 30 fps rate, but alter the successive frames to be taken at time 0 ms, then +30 ms, +30 ms, and +40 ms (and repeating in this cycle). Key here is that not all intervals are the same: the +40 ms interval is different to the 30 ms interval. The 30 ms is the more challenging for image capture, because it is less than the average time of 33.3 ms between frames.

The skilled person will understand that if illumination intensity I, as a function of time t, is given by $I(t)=I_0\cos^2(2\pi ft)$, where $2f$ is the intensity flicker frequency, then the time-averaged intensity is constant and is given by $I_0/2$.

Implementations in Detail

We assume we have a sensor working with a frame rate of N fps. Frames are read from the sensor at intervals of $T=1/N$ seconds. During each interval we have a sensor read out of Ta seconds and a blanking time V such that $T=Ta+V$.

It is important to note that it is possible to change the blanking interval V for most sensors in run time.

We assume Vmin is the minimum allowed V blanking value for our system.

We may decrease the interval time T by decreasing V blanking down to Vmin Also we could increase the interval time T by increasing V blanking to practically any value.

Suppose we have light powered with an alternating current with a frequency F. Actually the light flicker effect will be with frequency 2×F, because power varies with the square of the current. So the time intervals between light flickers will be Tf=1/(2×F). For example: for 50 Hz mains frequency, Tf=10 ms, and for 60 Hz mains frequency Tf=8.3 ms.

If we manipulate the value of V blanking in the way that T will be a multiple of Tf we will obtain pictures when all frames are at equivalent points in the light flickering cycle. This will eliminate the flicker artifact in the played-back video. To achieve this we need a big enough V blanking range in the sensor.

The upper value of V blanking should be at least Vmin+(T mod Tf). Here we come to limitation of: Ta=T−V<T−(T mod Tf)−Vmin=1/N−((1/N) mod 1/(2×F))−Vmin.

Let n=int((1/N)/(2×F))=int(2×F/N), where int(x) is the integer part of the expression x. Then ((1/N) mod 1/(2×F))=1/N−n×(1/(2×F))=1/N−int(2×F/N)/(2×F), so Ta<(int(2×F/N)/(2×F)−Vmin).

To satisfy this requirement, we need to program the light image sensor to a higher pixel rate frequency Fp.

Suppose we have a sensor with the following configuration: W—number of horizontal active pixels, Wb—horizontal blanking in pixels, H—number of vertical active pixels, then the time for read out will be Ta=(W+Wb)*H/Fp. From here we get the minimum required pixel frequency Fp=(W+Wb)*H/(int(2×F/N)/(2×F)−Vmin).

For example, we have a sensor with active image pixel output of 1920×1080 at 60fps with Wb=280 and 50 Hz mains frequency. So Fp=(1920+280)*1080/(int(100/60)/100−Vmin)=2200*1080/(1/100−Vmin) and roughly it is about 238 MHz instead of original 148.5 MHz.

In this example it means, roughly, that the sensor needs to be programmed to the pixel frequency corresponding to the double of the flicker frame rate but some frames will be further apart in time than the average time between frames, to achieve the required average frame rate, while the recorded frames will be recorded at the equivalent points in the light flickering cycle.

In another example with a lower frame rate, we have a sensor with an active output of 1920×1080 at 30 fps with Wb=280 and 50 Hz mains frequency. So Fp=(1920+280)*1080/(int(100/30)/100−Vmin)=2200*1080/(3/100−Vmin) and roughly it is about 79.2 MHz instead of the original 74.25 MHz.

In implementations, the pixel rate frequency is increased to a fixed value, and then the interval between frame capture times is varied by varying the V blanking value from frame to frame.

Even though the frames are captured at a non-constant rate, the video may be assembled with frames which are equally spaced in time. In typical implementations, the jerkiness which could arise because the video frame display times are not exactly the same as the frame capture times is too small to see.

The variation of V blanking is necessary, if the pixel rate frequency is kept constant. This is because since T=Ta+V, if Ta is constant you can't change T without changing V.

We can define the time instant when the very first pixel of the frame starts integration as "shutter start". We can define the time instant when the very last pixel of the frame stops integration as "shutter stop". The capture process is the internal process of the sensor that we control in terms of the "shutter start" and "shutter stop".

As a result we have four variables to drive the capture process: (a) the time difference between one "shutter start" and the next "shutter start", (b) the time difference between a "shutter stop" and the next "shutter start", (c) the time difference between a "shutter start" and the next "shutter stop" and (d) the time difference between one "shutter stop" and the next "shutter stop".

For the process in which video frames are recorded unevenly with respect to time and in synchronization with a lighting flicker frequency, this may be achieved by controlling "shutter starts" or "shutter stops" that is by controlling (a) or by controlling (d).

The sensor integration time directly impacts on (c). The values of (a), (c) or (d) could be driven by modifying sensor parameters like total frame height or vertical blanking.

Because in most sensors there is access to a rolling shutter, we can eliminate the flicker by modulating phase ("shutter starts" or "shutter stops"), for the process in which video frames are recorded unevenly with respect to time and in synchronization with a lighting flicker frequency, but this does not remove uneven lighting across an image. However, any such uneven lighting effect is removable with a shading correction across the image, because this effect will be static and will repeat from frame to frame.

When the sensor shutter parameters are changed, which is basically an integration time change, therefore (c) is changed. If a change is applied to (d), the effect of uneven light distribution may shift across a frame. To avoid this shift, we should keep sum (b)+(c) constant by modifying (b) accordingly. However, if a change is applied to (a), the shift will not happen.

In case of a high frame rate it could use a lot of battery power to run a sensor at a very high frequency. An alternative approach could be applied to partly remove flicker, that is, to the case of flicker frequency G but with parameters for the flicker frequency n*G, where n is an integer which is 2, or which is greater than 2.

An example for the case n=2 is: with 60 fps and mains frequency 50 Hz, i.e. flicker frequency G of 100 Hz, we can apply an approach for flicker reduction as if there were 2*G (200 Hz) frequency flicker. As a result we will have time intervals in multiples of 5 ms and we will have two types of frames related to the flicker in terms of lighting. Basically we will have "ideal flicker", the flicker that will constantly repeat and not move across the image from frame to frame. The flicker will turn into blinking. This type of flicker could be easily removed by extra image processing in hardware or software. Also this blinking effect could be used to auto-detect flicker.

In more detail, when in the presence of flicker frequency G we apply the approach for flicker reduction with parameters for the flicker frequency 2*G, we will have two types of frames that are related to each other by half a period, or we could say by 90 degrees phase difference.

For example if we have 60 fps and 50 Hz mains frequency, 100 Hz is the flicker frequency, 200 Hz is double the flicker frequency, and we could put frames at time intervals of 15 ms, 15 ms, 20 ms, 15 ms, 15 ms, 20 ms, and so on. So the frame time positions will be 1st frame—0 ms, 2nd frame—15 ms, 3rd frame—30 ms, 4th frame—50 ms, 5th frame—65 ms, 6th frame—80 ms, 7th frame—100 ms and so on. We can see that 2nd, 5th, . . . (3*m−1)th frames are related by 90 degrees phase difference to the other, non-(3*m−1)th frames, where m is an integer. This is because (3*m−1)th frames occur at a multiple of 5 ms in time, but not at a multiple of 10 ms in time (eg. because 15 ms and 65 ms are multiples of 5 ms, but not multiples of 10 ms), whereas the non-(3*m−1)th frames occur at multiples of 10 ms in time (eg. 0 ms, 30 ms, 50 ms, 80 ms). So we have one of every three frames blinking. In this example, three successive frames is a cycle of video recording, as would be clear to one skilled in the art.

First of all this makes it possible to detect flicker easily, because each pixel will have only two states of brightness in relation to the flicker. The difference between blinking frames can be measured in each pixel and compensation gain can be applied in image processing to eliminate blinking completely. Colorization can be removed if the measurement is made per color channel and the respective gain is applied per color channel This additional approach is very important because we therefore have an approach to remove all possible effects produced by flicker and to remove it completely.

Applications

Applications include those in which a video is recorded that might be affected by flicker associated with artificial light. Such applications include: smartphones; computer vision systems; object recognition systems; human detection systems; autonomous vehicle computer vision systems; and/or robotics computer vision systems.

Devices which may utilize the method of reducing flicker in a video for playback include smartphones including a video camera, tablet computers including a video camera, desktop computers including a video camera, laptop computers including a video camera and digital video cameras, for example. The method may also be used by a computer in connection with, and controlling, a digital video camera.

Implementations for a Traveller

In today's globalized world, users of devices including a digital video camera may travel from a region with an electricity supply which has a mains frequency of 50 Hz, to a region with an electricity supply which has a mains frequency of 60 Hz, or vice versa. An example is that North America has a mains frequency of 60 Hz, whereas Europe has a mains frequency of 50 Hz. Another example is that Japan has two regions, one with a mains frequency of 50 Hz, and the other with a mains frequency of 60 Hz.

It is desirable that such a device can continue to eliminate video playback flicker, even if the device travels between regions with different mains frequencies.

The device may determine its position using a position determining system, which may be a global positioning system (GPS) sensor, a system which can determine a position based on identified cellular phone network towers, or a system which can determine a position based on identified WiFi stations, for example. The device may then identify the local mains frequency based on the determined position, and then implement a method of reducing human-perceivable flicker in a digital video, based on the local lighting flicker frequency, which is double the mains frequency. In an example, the local mains frequency is identified based on consulting a database on the device. For example, such a database could be a map database, in which various areas of the map each has an associated mains frequency. In an another example, the determined position could be sent to a server, the server then determining the mains frequency which corresponds to the determined position, and the server returning the mains frequency to the device, so that the device can then implement a method of reducing human-perceivable flicker in a digital video, based on the correct local lighting flicker frequency.

A device may be configured to determine the local mains frequency each time it is turned on. A device may be configured to determine the local mains frequency each time the digital camera is prepared for filming. A device may include a setting which sets the local mains frequency which is assumed by the device when implementing a method of reducing human-perceivable flicker in a digital video. This may be useful when a device is located near a border between two regions with different mains frequencies, so that the local mains frequency might be identified incorrectly, such as due to position determination inaccuracy, for example. The setting may also be useful if the device is located somewhere in which its position cannot easily be determined, such as in a tunnel. The setting may also be useful if the mains frequency has drifted from a standard value, such as from 60 Hz to 60.5 Hz.

Note

It is to be understood that the above-referenced arrangements are only illustrative of the application for the principles of the present disclosure. Numerous modifications and alternative arrangements can be devised without departing from the spirit and scope of the present disclosure. While the present disclosure has been shown in the drawings and fully described above with particularity and detail in connection with what is presently deemed to be the most practical and preferred example(s), it will be apparent to those of ordinary skill in the art that numerous modifications can be made without departing from the principles and concepts as set forth herein.

What is claimed is:

1. A method for reducing human-perceivable flicker during playback of a digital video, recorded at an illumination intensity, the illumination intensity varying at a lighting flicker frequency and having a constant time-averaged illumination intensity, the method comprising, during a plurality of cycles of video recording within which video frames are recorded unevenly with respect to time, and all video frames during the plurality of cycles are captured either in synchronism with a phase of the lighting flicker frequency or 90 degrees out of phase with the lighting flicker frequency:

capturing, during the plurality of cycles, a plurality of first frames in synchronism with the phase of the lighting flicker frequency and such that there is a first time interval between a first pair of successive first frames of the plurality of first frames and a second time interval, different from the first time interval, between a second pair of successive first frames of the plurality of first frames;

capturing, during the plurality of cycles, at least one second frame 90 degrees out of phase with respect to the phase of the lighting flicker frequency; and applying image processing, the image processing comprising applying a compensation gain to the at least one second frame to compensate for a difference in brightness between the plurality of first frames and the at one second frame.

2. The method of claim 1, comprising:

determining an interval between capturing a first frame of the plurality of first frames and capturing a second frame of the at least one second frame, the second frame subsequent to the first frame; and implementing the interval by setting a corresponding V blanking value.

3. The method of claim 1, comprising assembling the digital video for playback with the plurality of first frames and the at least one second frame being equally spaced in time.

4. The method of claim 1, comprising:
determining a geographic position using a position determining system; and
determining the lighting flicker frequency based on the geographic position.

5. The method of claim 1, wherein
the lighting flicker frequency is double a local mains frequency, the local mains frequency being a user settable parameter for use in video recording.

6. The method of claim 1, wherein the lighting flicker frequency is 120 Hz.

7. The method of claim 1, wherein the lighting flicker frequency is 100 Hz.

8. A system for reducing human-perceivable flicker during playback of a digital video recorded at an illumination intensity, the illumination intensity varying at a lighting flicker frequency and having a constant time-averaged illumination intensity, the system comprising a computer configured to control a video camera to, during a plurality of cycles of video recording within which video frames are recorded unevenly with respect to time, and all video frames of the plurality of cycles are recorded either in synchronism with a phase of the lighting flicker frequency or 90 degrees out of phase with the lighting flicker frequency:
capture, during the plurality of cycles, a plurality of first frames in synchronism with the phase of the lighting flicker frequency and such that there is a first time interval between a first pair of successive first frames of the plurality of first frames and a second time interval, different from the first time interval, between a second pair of successive first of the plurality of first frames;
capture, during the plurality of cycles, at least one second frame 90 degrees out of phase with respect to the phase of the lighting flicker frequency; and
apply image processing, the image processing comprising applying a compensation gain to the at least one second frame, to compensate for a difference in brightness between the plurality of first frames and the at least one second frame.

9. The system of claim 8, wherein the computer is further configured to control the video camera to:
determine an interval between capturing a first frame of the plurality of first frames and capturing a second frame of the at least one second frame, the second frame subsequent to the first frame; and
implement the interval by setting a corresponding V blanking value.

10. The system of claim 8, wherein the computer is further configured to control the video camera to assemble the digital video for playback with the plurality of first frames and the at least one second frame being equally spaced in time.

11. The system of claim 8, wherein the computer is further configured to control the video camera to:
determine a geographic position using a position determining system; and
determine the lighting flicker frequency based on the geographic position.

12. The system of claim 8, wherein
the lighting flicker frequency is double the local mains frequency, the local mains frequency being a user settable parameter for use in video recording.

13. The system of claim 8, wherein the lighting flicker frequency is 120 Hz.

14. The system of claim 8, wherein the lighting flicker frequency is 100 Hz.

* * * * *